US010426982B2

(12) United States Patent
Bornack

(10) Patent No.: US 10,426,982 B2
(45) Date of Patent: Oct. 1, 2019

(54) LINE SECURING DEVICE

(71) Applicant: Bornack GmbH & Co. KG, Ilsfeld (DE)

(72) Inventor: Klaus Bornack, Mundelsheim-Schreyerhof (DE)

(73) Assignee: Bornack GmbH & Co. KG, Ilsfeld (DE)

( * ) Notice: Subject to any disclaimer, the term of this patent is extended or adjusted under 35 U.S.C. 154(b) by 15 days.

(21) Appl. No.: 15/735,935

(22) PCT Filed: Jun. 10, 2016

(86) PCT No.: PCT/EP2016/063408
§ 371 (c)(1),
(2) Date: Dec. 12, 2017

(87) PCT Pub. No.: WO2016/198680
PCT Pub. Date: Dec. 15, 2016

(65) Prior Publication Data

US 2018/0185679 A1 Jul. 5, 2018

(30) Foreign Application Priority Data

Jun. 12, 2015 (DE) ........................ 10 2015 109 444

(51) Int. Cl.
*A62B 1/08* (2006.01)
*A62B 35/00* (2006.01)
(Continued)

(52) U.S. Cl.
CPC ............ *A62B 35/0093* (2013.01); *A62B 1/10* (2013.01); *A62B 35/0075* (2013.01); *E04G 21/3204* (2013.01)

(58) Field of Classification Search
CPC ............ B62B 35/0093; B62B 35/0075; E04G 21/3204; A62B 1/06; A62B 1/08
(Continued)

(56) References Cited

U.S. PATENT DOCUMENTS 2,659,573 A 1/1951 Smith, Sr.
2,990,131 A * 6/1961 Carlsson ............ A62B 35/0093 182/237
(Continued)

FOREIGN PATENT DOCUMENTS

DE 26 46 368 B1 4/1978
GB 2 256 413 A 9/1992
(Continued)

*Primary Examiner* — Jerry E Redman
(74) *Attorney, Agent, or Firm* — Robert A. Blaha; Smith Tempel Blaha LLC

(57) ABSTRACT

A securing device for securing a person has an axle element attached torque-proofly to a rope drum and rotatably to a support structure, such that, by the axle element, the rope drum is supported rotatably at the support structure. A lever is attached pivotably to the support structure at a deflection point. In a blocking position of the lever, a blocking section is coupled to the rope drum in order to disable a rotation of the rope drum, and in a releasing position of the lever, the blocking section is decoupled from the rope drum and the rope drum is rotatable. A thread section of the lever is coupled to a further thread section of the axle element, such that, upon rotation of the axial element, due to the rotation of the rope drum, the thread section is shifted along the axle element, such that, due to the shifting of the thread section, a rotation of the lever around the deflection point and an adjustment between the blocking position and the releasing position of the lever are effected.

17 Claims, 8 Drawing Sheets

(51) Int. Cl.
*A62B 1/10* (2006.01)
*E04G 21/32* (2006.01)

(58) Field of Classification Search
USPC .................... 182/235, 234, 240, 71, 72, 239
See application file for complete search history.

(56) References Cited

U.S. PATENT DOCUMENTS 3,760,910 A * 9/1973 Koshihara .......... A62B 35/0093 182/237
4,602,699 A * 7/1986 Matt ........................ A62B 1/10 182/234
5,351,908 A * 10/1994 Umezawa ............. B60R 22/415 242/383.4
5,401,034 A * 3/1995 Mallinger ............ A63B 21/153 473/576
5,593,105 A * 1/1997 Schmid ................... B60R 22/36 242/383.4
6,158,685 A * 12/2000 Kielwein .............. B60R 22/405 242/383.2
6,224,008 B1 * 5/2001 Smithson ............ B60R 22/4628 242/374
6,279,682 B1 * 8/2001 Feathers ............ A62B 35/0093 182/239
6,598,822 B2 * 7/2003 Nagata .................... B60R 22/40 242/379.1
7,870,934 B2 * 1/2011 Ecker ................. A62B 35/0093 182/234
7,896,281 B2 * 3/2011 Bleshoy ............... A01K 27/004 119/796
8,516,979 B2 * 8/2013 Ek ...................... B65H 75/4431 119/796
9,723,816 B2 * 8/2017 O'Brien ............... A01K 27/004
9,751,495 B2 * 9/2017 Ford ....................... B60R 22/34
9,937,367 B1 * 4/2018 Huang ............... A62B 35/0025
10,207,128 B2 * 2/2019 Hetrich .................... A62B 1/08
2003/0111571 A1 * 6/2003 Weller .................... B60R 22/36 242/383.2
2004/0065763 A1 * 4/2004 Hanna ................... B60R 22/415 242/383
2005/0145435 A1 * 7/2005 Choate ............... A62B 35/0093 182/3
2007/0001047 A1 * 1/2007 Yasuda ............... B60R 22/3413 242/379.1
2008/0271683 A1 * 11/2008 Mitchell .............. A01K 27/004 119/796
2009/0084631 A1 * 4/2009 Casebolt .................. A62B 1/10 182/235
2009/0260922 A1 10/2009 Marquardt et al.
2009/0321550 A1 * 12/2009 Boyer ...................... A62B 1/10 242/396.4
2010/0108796 A1 * 5/2010 Tonn ....................... B60R 22/36 242/383
2010/0116922 A1 * 5/2010 Choate ................... A62B 35/04 242/384.7
2010/0181145 A1 * 7/2010 Hobson .................... A62B 1/10 182/234
2010/0308149 A1 * 12/2010 Allington ................. A62B 1/08 242/379
2011/0088976 A1 * 4/2011 Jones ................ A62B 35/0093 182/231
2013/0105247 A1 * 5/2013 Casebolt .................. A62B 1/10 182/241
2014/0151155 A1 * 6/2014 Choate ............... A62B 35/0075 182/239
2016/0096048 A1 * 4/2016 Fegley ................ E04G 21/3204 182/232
2016/0338323 A1 * 11/2016 Nishida ................ A01K 27/004
2018/0078795 A1 * 3/2018 Lin ........................ A62B 35/04
2018/0178044 A1 * 6/2018 Hetrich .................... A62B 1/08

FOREIGN PATENT DOCUMENTS

GB 2 256 414 A 9/1992
WO WO 2011120519 A2 10/2011

* cited by examiner

LINE SECURING DEVICE

CROSS-REFERENCE TO RELATED APPLICATIONS

This application is a national phase application, which is derived from international patent application number PCT/EP2016/063408, filed on Jun. 10, 2016, and which claims the benefit of the filing date of German patent application number DE 10 2015 109 444.4, filed Jun. 12, 2015, the disclosures of which are hereby incorporated by reference in their entirety.

TECHNICAL FIELD

The present invention relates to a securing device for securing a person, and to a method for securing a person by the securing device.

TECHNOLOGICAL BACKGROUND

When working at large heights, it is necessary to secure persons against a fall from heights by safety devices. Thereby, the persons are usually secured to load-bearing supports (or backings) or walls by rope securing devices. At the same time, the rope securing devices must be operable easily (or comfortably) and free-movingly in order to hamper the person in his movement as little as possible.

For this purpose, for example rope drums are used, on which a safety rope (or securing rope) and/or a safety band (or securing band) is reeled (or coiled). The safety rope connects the person to a load-bearing attachment point, e.g. at a wall. If the person moves, then the rope drum releases the securing rope or reels it again. If the person has reached a desired working position, then the unreeling of the securing rope from the rope drum can be disabled and fixed.

In particular, the rope drums must be operable easily and at the same time must have a stable and reliable mechanism in order to provide a high safety standard with a simultaneous comfortable operation.

SUMMARY

There may be a need to provide a robust securing device for securing a person, which securing device enables an easy operation by the person to be secured.

This need may be satisfied by a securing device for securing a person, and by a method for securing a person by the device, according to the independent claims.

According to an exemplary embodiment of the present invention, there is described a securing device for securing a person. The securing device has a support structure (or carrier structure) (e.g. a supporting housing), and a rope drum (or cable drum). A safety rope (and/or a safety band), to which the person is attachable, is reelable on (and correspondingly unreelable from) the rope drum. The securing device further has an axle element, which is attached torque-proofly to the rope drum and rotatably (for example by a friction bearing or a ball bearing) to the support structure, such that, by the axle element, the rope drum is supported rotatably at the support structure.

The securing device further has a lever, wherein the lever is attached pivotably to the support structure at a deflection point. The lever has a blocking section, which is configured a) such that, in a blocking position of the lever, the blocking section is coupled to the rope drum in order to disable (or prevent) a rotation of the rope drum (and accordingly an unreeling of the safety rope), and b) such that, in a releasing position of the lever, the blocking section is decoupled from the rope drum and the rope drum is rotatable (and accordingly, an unreeling of the safety rope is enabled).

The lever has a thread section, which is spaced apart from the blocking section. The axle element has a further thread section. The thread section is coupled to the further thread section, such that, upon rotation of the axle element, due to the rotation of the rope drum, the thread section is shifted along the axle element (in the axis direction so to say), such that due to the shifting of the thread section, a rotation of the lever around the deflection point and an adjustment (or switching) between the blocking position and the releasing position of the lever are effected.

Overview of Embodiments

According to another exemplary embodiment of the present invention, there is described a method for securing a person by the securing device described above. According to the method, the rope drum is rotated relative to the support structure, wherein the thread section of the lever is coupled to the further thread section of the axle element, such that, upon rotation of the axle element, due to the rotation of the rope drum, the thread section is shifted along the axle element, such that, due to the shifting of the thread section, a rotation of the lever around the deflection point and an adjustment (or switching) between the blocking position and the releasing position of the lever are effected.

In an exemplary embodiment example of the present invention, the support structure as well as the rope drum may be manufactured for example from a rigid material and may be suitable to receive high forces from the rope drum. The support structure may be manufactured for example from a metallic material and/or a metal compound. Furthermore, the carrier structure may be manufactured from fibre-reinforced materials. The support structure may simultaneously form a housing, which may house the rope drum and the further elements of the securing device, such as for example the lever and the axle element. For example, a further safety rope or attachment means may be arranged at the support structure, by means of which safety rope or attachment means the support structure and thus the securing device can be attached to a load-bearing structure, such as for example a load-bearing attachment point, e.g. at a wall or a pillar, or at the person to be secured.

In an exemplary embodiment example of the present invention, the rope drum may have for example a reeling section, on which the safety rope may be reeled. In the present invention, the safety rope may for example have a circular cross-sectional profile, or may be ribbon-like (or band-like), i.e. may have a cross-sectional profile having a low thickness in comparison to its width.

In an exemplary embodiment example of the present invention, the safety rope may be attached to the rope drum at one end, and may be reeled on the rope drum due to a rotation of the rope drum. Alternatively, according to an embodiment example of the present invention that is described in more detail further below, the safety rope may run through the rope drum. The safety rope may be unreeled from the rope drum as long as the rope drum is rotatable at the support structure. The rope drum may be rotatable as long as the lever may be present in the releasing position. The safety rope may further be attached, at another end (of the rope), to the person to be secured or to a load-bearing structure, such as for example a load-bearing attachment point, e.g. at a wall or a pillar.

In an exemplary embodiment example of the present invention, as from a particular unreeled rope length of the safety rope, the lever may adjust in the blocking position, and may block a further rotating of the rope drum and thus a further unreeling of the safety rope from the rope drum. Thus, a desired unreeling length of the rope can be adjusted.

In an exemplary embodiment example of the present invention, the axle element may be coupled torque-proofly to the rope drum and may be coupled to the support structure rotatably relative to the support structure. The axle element may represent for example a component that may be structurally separate from the rope drum. Furthermore, the axle element may be formed integrally, and in one piece, with the rope drum.

In an exemplary embodiment example of the present invention, the axle element may for example be attached to and/or supported rotatably at the support structure by a friction bearing or by a ball bearing.

In an exemplary embodiment example of the present invention, at a deflection point, the lever may be attached rotatably to the support structure. For example, a rotation pin may form the deflection point, by which the lever may be pivotably attached to the support structure. The lever may be manufactured for example from metal or from a fibre-reinforced material, in order to possibly transmit high loads.

In an exemplary embodiment example of the present invention, the lever may be formed rectilinear, bent, or, according to a further exemplary embodiment example, as an angle lever, depending on the arrangement at the support structure. Along the lever, the lever may have a blocking section and a thread section that may be spaced apart from the blocking section.

In an exemplary embodiment example of the present invention, the blocking section may be configured to disable (or prevent), in the blocking position of the lever, the rotation of the rope drum and correspondingly the unreeling of the safety rope. For this purpose, different concrete embodiment examples of the present invention are described in the following. For example, the blocking section may have a friction surface in order to produce, in the blocking position, a high friction force between the rope drum and/or the safety rope, whereby the further rotation of the rope drum may be blocked. Alternatively, the blocking section may produce, in the blocking position, a form-fit with the rope drum in order to possibly prevent a further unreeling of the rope.

In an exemplary embodiment example of the present invention, an essential aspect of the present invention may consist in that the lever may have the thread section and the axle element may have a further thread section. The thread section of the lever may correspond to the further thread section of the axial element, such that a thread connection may be established between the lever and the axle element. Upon rotation of the axle element, which may be caused by the rotation of the rope drum and correspondingly by the unreeling of the safety rope, the thread section may migrate along the further thread section of the axle element (that is in particular along the rotation axis of the axle element), such that the movement of the thread section along the axle element may cause an adjustment and/or a swiveling of the lever around the deflection point.

In an exemplary embodiment example of the present invention, if the rope drum and/or the axle element rotates in a first rotational direction in order to unreel the rope, the lever may swivel from the releasing position in the blocking position until the lever may disable the rotation of the rope drum and the blocking position may be reached.

In an exemplary embodiment example of the present invention, if the safety rope is reeled on the rope drum again, then the rope drum and/or the axle element may rotate in a second rotational direction, which may be opposite to the first rotational direction. Upon rotation of the rope drum in the second rotational direction, the lever may swivel from the blocking position in the releasing position.

In an exemplary embodiment example of the present invention, the present securing device may thus prescribe exactly an unreeling length of the safety rope. Starting from a desired unreeled rope length, which may be indicative to a number of rotations of the rope drum, the lever may be in the blocking position due to the thread coupling, such that a further unreeling may be blocked as from the desired unreeled rope length. Thus, a desired roping area for the person to be secured can be adjusted, though at the same time the safety rope may be reeled on the rope drum and, may not hamper, in a loose state, the movement of the person to be secured, if the prescribed roping length is not reached yet. Thus, a securing for the person to be secured, which securing may be comfortable and easy to be operated, may be established by the present securing device. At the same time, the securing device may be embodied robustly, because a reliable mechanical mechanism may be provided due to the thread connection with a low number of movable elements.

According to a further exemplary embodiment example of the present invention, the lever may be formed as an angle lever. The lever may have a first leg and a second leg, which may be bent from the first leg, wherein the blocking section may be formed at the first leg and the thread section may be formed at the second leg.

In an exemplary embodiment example of the present invention, the angle lever may differ from a lever that is formed rectilinear. In an angle lever, both opposing ends may not be located along one extension direction, which may extend in a longitudinal direction through the lever. The first leg having the first end of the lever may have for example a first extension direction, and the second leg having the second end of the lever, which second end may be opposite to the first end, may have a second extension direction, wherein an angle may be present between the first extension direction and the second extension direction. The angle may have for example a range from 10 to 45 degrees. In an angle lever, the deflection point may not be on a line, which connects the first end and the second end with each other.

According to a further embodiment example of the present invention, the lever may be formed such that the deflection point may be arranged between the thread section (for example at the second leg) and the blocking section (for example at the first leg).

According to a further embodiment example of the present invention, the thread section may have a lever section and a thread element, wherein the thread element may be pivotably attached to the lever section.

In an exemplary embodiment example of the present invention, the thread element of the lever may for example form a threaded nut, which may have an inside thread. The further thread section of the axle element may have for example a corresponding external thread, such that the thread nut may be movable along the external thread, when the axle element rotates.

In an exemplary embodiment example of the present invention, accordingly, alternatively, the thread element of the lever may represent a thread stud (or pin) having an external thread, wherein the further thread section of the axle element may have for example a borehole having an according corresponding inside thread, such that the thread stud can be screwed into and can be screwed out of the borehole, if the axle element rotates.

In an exemplary embodiment example of the present invention, the lever section may describe a section of the lever, to which the thread element may be attached movably or rigidly.

In the exemplary embodiment example of the present invention, for example, the thread element may be attached pivotably to the lever section, for example by an attachment pin. In addition or alternatively, the thread element may also be attached (translationally) shiftably to the lever section. Accordingly, in a further exemplary embodiment, the lever section may have an elongated hole, wherein the thread element may have an attachment pin, which may be supported (translationally) shiftably in the elongated hole.

In the exemplary embodiment example of the present invention, thus, the thread element may shift translationally along the further thread section of the axle element, and the lever may rotate around the deflection point, without a mechanical wedging and/or a blockage of the movement mechanics occurring.

As has been mentioned at the beginning, according to a further embodiment example of the present invention, the blocking section may, in the blocking position, form a friction connection with the rope drum. For example, the lever may be swiveled such that the blocking section may press against the rope drum in order to thus possibly increase a friction between the blocking section and the rope drum. Furthermore, the lever may be swiveled such that the blocking section may press against the safety rope and thus indirectly against the rope drum in order to thus possibly increase a friction between the blocking section and the safety rope. An increase of the friction between the blocking section and the safety rope may also result in a blockage of the rotational movement of the rope drum.

According to a further embodiment example of the present invention, the rope drum may have at least one snap notch, wherein the lever may form, in the blocking position, a form-fit with the snap notch of the rope drum. In other words, the lever may be swiveled to the blocking position such that the blocking section may engage directly or indirectly in the snap notch in order to thus possibly stop a rotation of the rope drum.

According to a further embodiment example of the present invention, the securing device may have a snap cam, which may be arranged pivotably at the support structure. In the blocking position, the blocking section of the lever may swivel the snap cam, until the snap cam may engage in the snap notch for forming the form-fit. Thus, the lever may form the form-fit indirectly via the snap cam.

In the exemplary embodiment example of the present invention, thus, the lever having its blocking section may not engage directly in the snap notch, but indirectly via the pivotable snap cam. The pivotable snap cam may have for example a return spring, the spring force of which may push and/or pull the snap cam out of the snap notch. Thus, the snap cam may swivel automatically out of the snap notch, if the swivel is in the releasing position and the blocking section thereof does not press on the snap cam.

According to a further embodiment example of the present invention, the snap notch may be formed such that, in the blocking position, the blocking section may engage directly in the snap notch for forming the form-fit.

According to a further embodiment example of the present invention, the securing device may have a rotation pin, which may attach the lever pivotably to the support structure at the deflection point.

According to a further embodiment example of the present invention, the rotation pin may be adjustable relative to the support structure, in particular parallel along an axis direction of the axle element.

In the exemplary embodiment example of the present invention, the rotation pin may form the deflection point of the lever. Accordingly, a shifting of the rotation pin and accordingly of the deflection point may cause a change of the distance between the lever and the rope drum. Upon a change of the distance between the lever and the rope drum, and in particular upon a change of the deflection point of the lever relative to the rope drum, also the entry of the blocking position of the lever with respect to a movement of the thread section of the lever along the axle element may change. By a change of the deflection point of the lever, also the swiveling trajectory of the blocking section relative to the movement of the thread section of the lever along the axle element may change. The rotation pin may form a rotation axis of the lever, wherein the rotation axis may be for example not parallel to the rotation axis of the rope drum/axle element and in a radial direction of the rotation axis of the rope drum/axle element.

In the exemplary embodiment example of the present invention, the adjustment of the rotation pin relative to the support structure may also be used to release manually the blocking position of the lever in order to enable an anew reeling of the rope drum.

In the exemplary embodiment example of the present invention, in other words, in a first position of the deflection point, after a first number of rotations of the rope drum, the blocking position of the lever may be reached, while at a second position of the deflection point, after another second number of rotations of the rope drum, the blocking position of the lever may be reached. Thus, by the shifting of the deflection point of the lever, the unreelable rope length of the safety rope can be adjusted, because, until reaching the blocking position, the unreelable rope length may be proportional to the number of rotations of the rope drum.

According to a further embodiment example of the present invention, the securing device may have an actuating means, to which the rotation pin may be coupled. The actuating means (for example, a lever, a slider (or pusher) or a press button) may be configured to adjust the rotation pin relative to the support structure.

According to a further embodiment example of the present invention, the actuation means may have a snap section and the support structure may have a further snap section. The snap section and the further snap section may be configured such that the rotation pin may be adjustable relative to the support structure by actuating the actuating means and may be fixable to the further snap section at a defined position by a catching of the snap section. For example, the actuating means may be a slider (or pusher), which may be arranged shiftably at the support structure and which may be configured such that, upon pushing the slider, the snap section and the further snap section may be decoupled, and, upon a simultaneous shifting of the slider, an adjustment of the deflection point may be caused. The slider may have a return force, which may be generated for example by a spring or by an elastic deformation behaviour thereof, such that the slider, after disabling the pushing movement, the snap section and the further snap section may be coupled again and a further shifting of the deflection point may be disabled.

In an exemplary embodiment example of the present invention, alternatively to the above-described snap adjustment, also an adjustment screw may be arranged at the support structure, wherein the adjustment screw can be screwed into the actuating means and accordingly may form a thread connection with the actuating means. Accordingly, by means of screwing the adjustment screw, the actuating means can be shifted and thus an adjustability of the deflection point can be implemented.

According to a further embodiment example of the present invention, the securing device may have a centrifugal force element, which may be arranged movably at the rope drum. Upon rotation, in particular at (or as from) a predetermined rotation speed, of the rope drum, the centrifugal force element may be movable radially outwardly, such that a form-fit with the support structure can be established at (or as from) a predetermined rotation speed of the rope drum. The form-fit of the centrifugal force element with the support structure may result in a disabling of the rotation of the rope drum and thus in a stop of the unreeling of the safety rope.

In an exemplary embodiment example of the present invention, the support structure may have an according interior toothing, in which the centrifugal force element may engage at (or as from) a defined rotation speed of the rope drum.

In an exemplary embodiment example of the present invention, the centrifugal force element may be for example a slider (or pusher), which may be shiftable translationally radially outwardly along the radial direction of the rope drum. Alternatively, the centrifugal force element may be arranged pivotably at the rope drum, such that at (or as from) a predetermined rotation speed of the rope drum, the centrifugal force element may swivel radially outwardly and may establish a form-fit with the interior toothing of the support structure.

In an exemplary embodiment example of the present invention, the centrifugal force element may remain in a starting position for example by a return spring. As from a defined rotational speed of the rope drum, the centrifugal forces, which may act on the centrifugal force element, may increase. If the centrifugal forces exceed the return force of the return spring, then the centrifugal force element may shift radially outwardly and may lock a further movement of the rope drum. Alternatively, the centrifugal force element may be formed by damping elements, which may retain the centrifugal force element in the starting position. In addition, the control of the centrifugal force element may be effected by adjusting its weight and/or its weight distribution.

According to a further embodiment example of the present invention, the securing device may have a coil spring, wherein the coil spring may be arranged between the rope drum and the support structure, such that, in the releasing position, the rope drum may be rotatable due to a spring force of the coil spring. Thus, no freely suspending bights (or loops of the rope) (i.e. no slack rope) may arise, if there is no more tension on the safety rope. In other words, the safety rope may not remain blocked in the adjusted length, but may reel (or coil) tightly again.

According to a further embodiment example of the present invention, the rope drum may have a reeling path along a circumference of the rope drum, along which reeling path the safety rope can be reeled (or coiled). The reeling path further may have a first opening for rope and a second opening for rope, which may be formed along the circumferential direction spaced apart from the first opening for rope. The first opening for rope and the second opening for rope may be formed such that the safety rope may be guidable through the rope drum and such that, upon rotating the rope drum, both opposite rope ends of the safety rope can be reeled and unreeled simultaneously.

According to the embodiment example of the present invention, the safety rope may not be anchored load-bearingly on the rope drum, but may run through the latter. There may thus be a direct connection e.g. between the person to be secured and an attachment point, such that also the flux of force may run directly between the person to be secured and the attachment point. Thus, the securing device may have, more or less, only a reeling function and may have to transmit lower forces. Thus, the securing device may be designed and manufactured lighter and more conveniently (or low priced).

In an exemplary embodiment example of the present invention, alternatively, one rope end of the safety rope can be fixed to a rope end at the rope drum.

It is noted that the embodiments described herein represent only a limited number of possible embodiment variants of the invention. Accordingly, it is possible to combine the features of individual embodiments with each other in a suitable manner, such that, for a person skilled in the art, a variety of different embodiments is to be considered as being disclosed obviously by the explicit embodiment variants herein. In particular, some embodiments of the invention are described by device claims and other embodiments of the invention are described by method claims. However, it will become clear for the skilled person upon reading this application, that, unless it is explicitly stated differently, in addition to a combination of features, which belong to one type of subject of invention, also an arbitrary combination of features, which belong to different types of subjects of invention, is possible.

BRIEF DESCRIPTION OF THE DRAWINGS

In the following, embodiment examples are described with reference to the appended drawings in more detail for a further explanation and for a better understanding of the present invention. In the drawings.

DETAILED DESCRIPTION OF EXEMPLARY EMBODIMENTS

Figure 1:
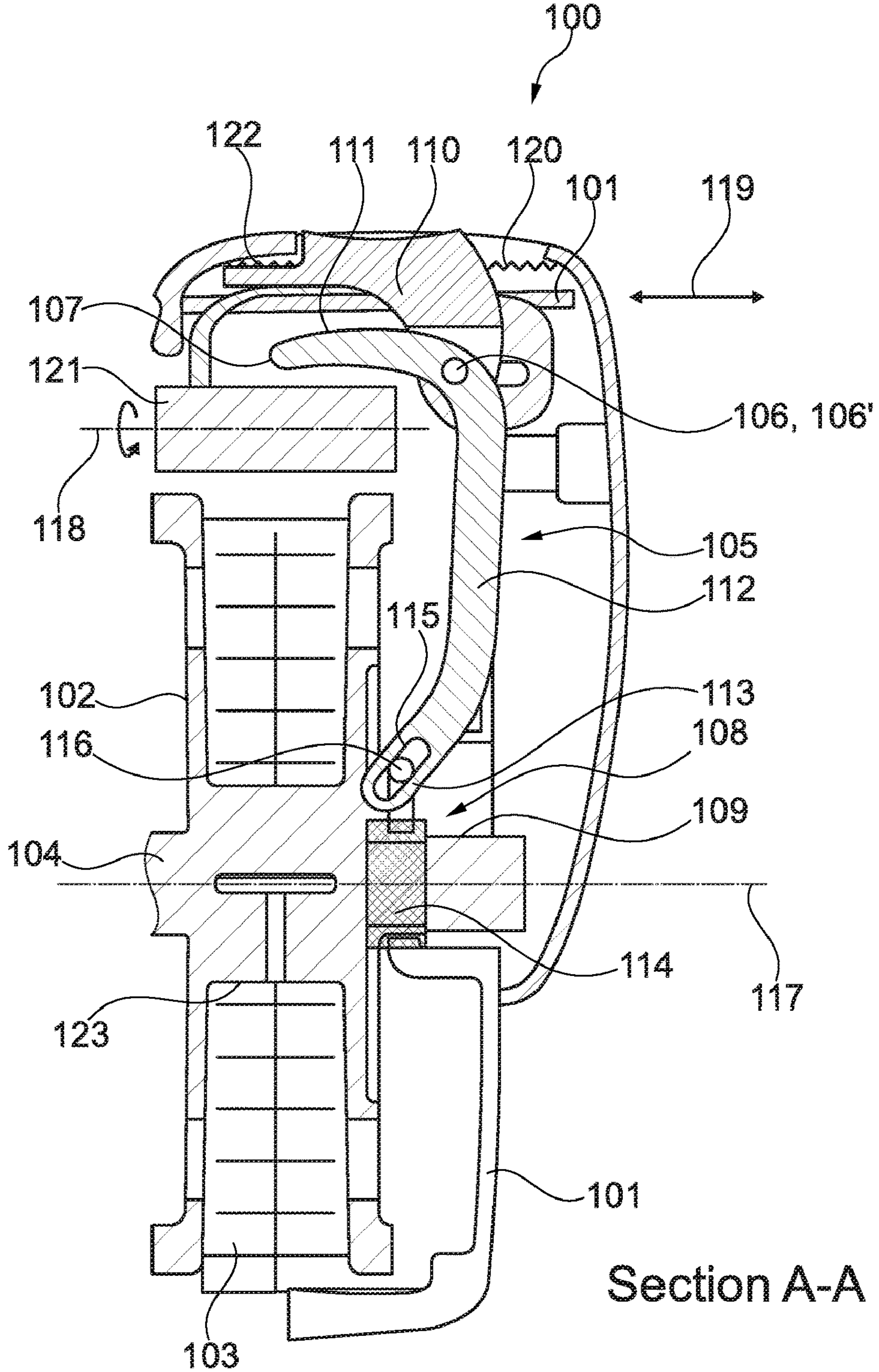
FIG. 1 shows a partial cross-sectional representation of the securing device of FIG. 3A according to an exemplary embodiment of the present invention, in which the lever is present in the releasing position.

Same or similar components in different figures are provided with the same reference numerals. The representations in the figures are schematically.

FIG. 1 to FIG. 3D show exemplary embodiments of the securing device 100 for securing a person, according to the invention. In FIG. 1, a lever 105 is represented in a releasing position, and in FIG. 2A and FIG. 2B, the lever 105 is represented in a blocking position.

The securing device 100 has a support structure (or carrier structure) 101 (e.g. a supporting housing) and a rope drum (or cable drum) 102. A safety rope 103 (and/or a safety ribbon), to which the person is attachable, is reelable on (and correspondingly unreelable from) the rope drum 102. The securing device 100 further has an axle element 104, which is attached torque-proofly to the rope drum 102 and rotatably to the support structure 101 (for example by a friction bearing or a ball bearing), such that the rope drum 102 is supported rotatably at the support structure 101 by the axle element 104.

The securing device 100 further has a lever 105, wherein the lever 105 is pivotably attached to the support structure 101 at an attachment point 106. The lever 105 has a blocking section 107. In a blocking position of the lever 105 (see FIG. 2), the lever is coupled to the rope drum in order to disable a rotation of the rope drum 102 (and accordingly an unreeling of the safety rope 103). In a releasing position of the lever 105 (see FIG. 1), the blocking section 107 is decoupled from the rope drum 102 and the rope drum 102 is rotatable (and accordingly, an unreeling of the safety rope 103 is enabled).

The lever 105 has a thread section 108, which is arranged spaced apart from the blocking section 107. The axle element 104 has a further thread section 109. The thread section 108 is coupled to the further thread section 109 by means of a thread connection, such that, upon rotation of the axle element 104, due to the rotation of the rope drum 102, the thread section 108 is shifted along the axle element 104 (so to say in an axis direction 117 of the rope drum 102 and the axle element 104), such that, due to the shifting of the thread section 108, a rotation of the lever 105 around the deflection point 106 and an adjustment between the blocking position and the releasing position of the lever 105 are effected.

In the shown embodiment, the support structure 101 forms a housing, which houses the rope drum 102 and the further elements of the securing device, such as for example the lever 105 and the axle element 104. For example, a securing element 501 (see FIG. 5) can be arranged at the support structure 101, by means of which securing element the support structure 101 and thus the securing device 100 can be attached to a load-bearing structure, such as for example a wall or a pillar, or to the person to be secured.

The rope drum 102 has a reeling section and/or a reeling path 123, on which the safety rope 103 is reeled. The safety rope 103 is attached to the rope drum 102 with one end, and is reeled on the rope drum 102 due to a rotation of the rope drum 102. Alternatively, and as is represented further below in FIG. 6, the safety rope 103 can be guided through the rope drum 102. The safety rope 103 can be unreeled from the rope drum 102 as long as the rope drum 102 is rotatable at the support structure 101. The rope drum 102 is rotatable as long as the lever 105 is present in the releasing position (see FIG. 1). The safety rope 103 may, at another end, further be attached to the person to be secured or to a load-bearing structure and/or an attachment point, such as for example a wall or a pillar.

As from a particular unreeled rope length of the safety rope 103, the lever 105 adjusts in the blocking position (see FIG. 2A and FIG. 2B), and blocks a further rotation of the rope drum 102 and thus a further unreeling of the safety rope 103 from the rope drum 102.

The axle element 104 is coupled torque-proofly to the rope drum 102, and is attached to the support structure 101 rotatably relatively to the support structure 101. The rope drum 102 and the axle element 104 rotate relative to the support structure 101 around the rotation axis 117.

The lever 105 is attached rotatably to the support structure 101 at the deflection point 106. For example, the rotation pin 106' may form the deflection point 106, by which the lever 105 is attached pivotably to the support structure 101.

In the exemplary embodiment, the lever 105 is formed as an angle lever. Along the lever 105, the lever has the blocking section 107 and, spaced apart therefrom, the thread section 108. The lever 105 has a first leg 111 and a second leg 112, which is bent from the first leg 111. The blocking section 107 is formed at the first leg 111, and the thread section 108 is formed at the second leg 112. In the angle lever 105, both opposite ends are not located along one extension direction, which extends in a longitudinal direction through the lever 105. The first leg 111 having the first end of the lever 105 has for example a first extension direction, and the second leg 112 having the second end of the lever 105, which second end is opposite to the first end, has a second extension direction, wherein an angle is present between the first extension direction and the second extension direction. The angle of the present angle lever 105 between the first leg 111 and the second leg 112 amounts to for example 45 degrees.

In the embodiment example shown, the second leg 112 extends from the axle element 104 besides the rope drum 102 radially outwardly up to the deflection point 106. The first leg 111 extends from the deflection point 106 along an axial direction with respect to the rotation axis 117. The deflection point 106 is located between the thread section 108 and the blocking section 107.

Thus, the blocking section 107 and the thread section 108 are spaced apart radially from each other and, simultaneously, are spaced apart axially from each other. The angle lever 105 is formed such that by rotating the lever 105 around the deflection point 106, a radial distance between the blocking section 107 and the rope drum 102 is changed.

The blocking section 107 is formed to prevent, in the blocking position of the lever 105, the rotation of the rope drum 102 and, accordingly, the unreeling of the safety rope 103.

The rope drum 102 has at least one snap notch 301 (see FIG. 3), wherein the lever 105, in the blocking position, forms a form-fit with the snap notch 301 of the rope drum. The securing device 100 has a snap cam 121, which is arranged pivotably around a rotation axis 118 (which extends e.g. parallel to the rotation axis 117) to the support structure 101. In the blocking position, the blocking section 107 of the lever 105 swivels the snap cam 121 until the latter engages in the snap notch 301 for forming the form-fit (see FIG. 4). Thus, the lever 105 forms the form-fit indirectly via the snap cam 121.

The pivotable snap cam 121 may for example have a return spring, the spring force of which pushes and/or pulls the snap cam 121 out of the snap notch 301. Thus, the snap cam 121 swivels out of the snap notch automatically, if the lever 105 is arranged in the releasing position and the blocking section 107 thereof (of the lever) does not press on the snap cam 121.

The thread section 108 of the lever 105 corresponds to the further thread section 109 of the axle element 104, such that a thread connection is established between the lever 105 and the axle element 104. Upon rotation of the axle element 104, which is caused by the rotation of the rope drum 102 and correspondingly by the unreeling of the safety rope 103, the thread section migrates along the further thread section of the axle element 104 (that is in particular along the rotation axis 117 of the axle element 104), such that the movement of the thread section 108 along the axle element 104 causes an adjustment and/or a swiveling of the lever 105 around the deflection point 106.

Figure 2A:
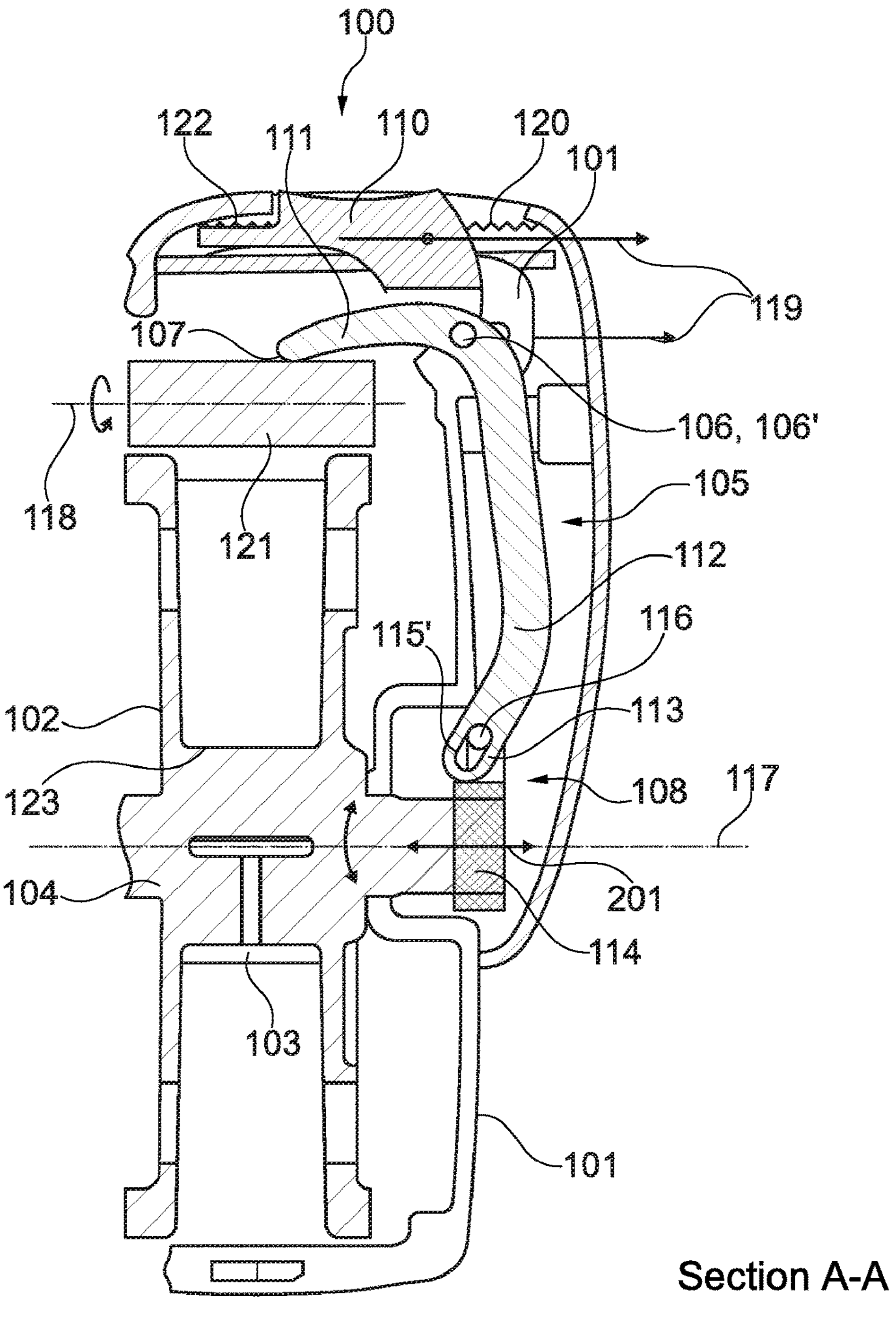
FIG. 2A and FIG. 2B show cross-sectional representations of the securing device according to separate exemplary embodiments of the present invention, in which the lever is present in the blocking position (the view presented in FIG. 2B illustrates the right-half portion of the embodiment illustrated in the front plan and perspective views of FIG. 3B and FIG. 3C, respectively when the entire support structure is present)

If the rope drum 102 and/or the axle element 104 rotates in a first rotation direction (in FIG. 1 and FIG. 2A along the rotation axis 117, from the left to the right) in order to unreel the rope 103, the lever 105 swivels from the releasing position in the blocking position, until the lever 105 disables the rotation of the rope drum 102 and the blocking position is reached (see FIG. 2).

If the safety rope 103 is reeled again on the rope drum 102, then the rope drum 102 and/or the axle element 104 rotates in a second rotation direction (in FIG. 1 and FIG. 2A along the rotation axis 117, from the right to the left), which is opposite to the first rotation direction. Upon rotation of the rope drum 102 in the second rotation direction, the lever 105 swivels from the blocking position in the releasing position (see FIG. 1).

The present securing device 100 may thus prescribe an unreeling length of the safety rope 103. As from a desired unreeled rope length, which is indicative with a number of rotations of the rope drum 102, the lever 105 is in the blocking position due to the thread coupling, such that a further unreeling is blocked as from the desired unreeled rope length. Thus, a desired roping area for the person to be secured can be adjusted, though at the same time the safety rope 103 is reeled on the rope drum 102 and does not, in a loose state, hamper the movement of the person to be secured, if the prescribed roping length is not reached yet.

In summary, the lever 105 is connected to the rope drum via a thread. By the pulling out of the ribbon (safety rope 103), the rope drum 102 is set in motion. The rope drum 102 in turn shifts the lever 105 horizontally (i.e. along the rotation axis 117 in FIG. 1) on the drum axis, i.e. the axle element 104, due to the thread connection. The horizontal movement is deflected in a vertical movement (which is perpendicular to the rotation axis 117) via the deflection point 106, and is thus deviated to the snap cam 121.

Figure 2B:
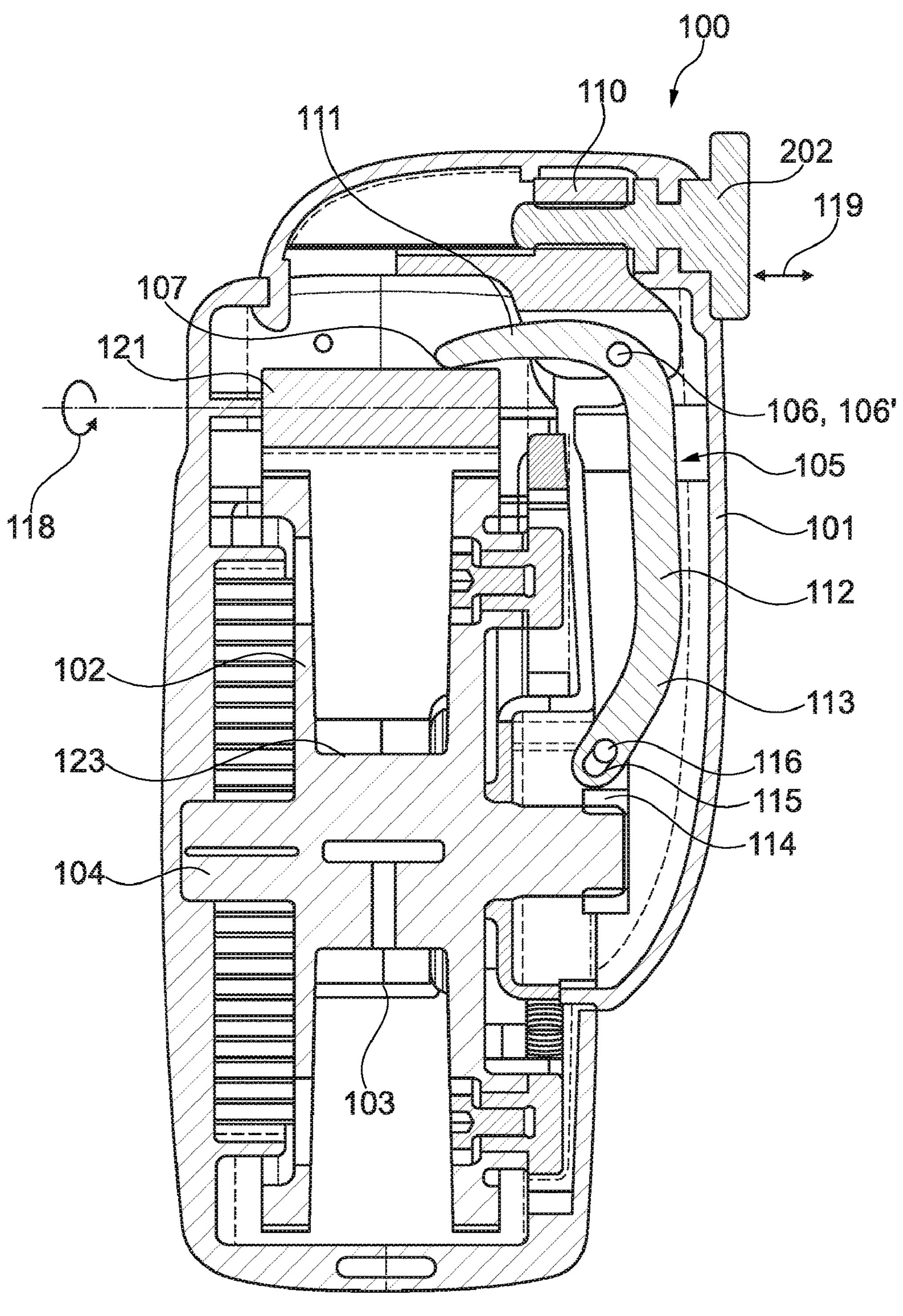

FIG. 2A and FIG. 2B show an end position, in which the ribbon and/or the safety rope 103 is pulled out up to a desired rope/ribbon length. By the pulling out of the rope and the corresponding rotation of the rope drum 102, the lever 105 has been brought to the outermost position (the position at the right hand side in FIG. 2A) of the drum axis, i.e. the axle element 104, via the thread connection. The movement of the lever, which is horizontal in FIG. 2A, has been deflected, via the deflection point 106, in a movement 201 (which is perpendicular to the rotation axis 117), which is vertical in FIG. 2A, and thus has been deviated to the snap cam 121.

The movement path of the lever 105, and thus the stroke path of the snap cam 121, are adjusted precisely and are in relation to different components, among others the length of the ribbon 103, the drum diameter of the rope drum 102, as well as the inclinations and lengths of the thread of the thread section 108 and of the further thread section 109.

Via an adjustment button as an actuation means 110, this relation can be changed by shifting the deflection point 106. Thus, after a readjustment of the lever 105, the latter abuts on the snap cam 121 earlier or later, dependent on the rotations of the rope drum, whereby the rope drum 102 is blocked earlier.

The further the adjustment button 110 and thus the deflection point 106 is shifted away from the "neutral position", i.e. away from the rope drum 102, the shorter is the path for the lever 105/the snap cam 121 for blocking the rope drum 102. In result of this, also the possible unreeling length of the ribbon 103 is decreased.

The unloaded ribbon (or safety rope) 103 is reeled via the rope drum 102 and e.g. the "spiral coil" that is incorporated therein. The snap cam 121 is mounted such that the reeling is enabled at any time, independent of the position of the adjustment button 110.

In the following, the coupling of the thread section 108 with the further thread section 109 according to the shown embodiment example is explained.

The thread section 108 has a lever section 113 and a thread element 114.

The thread element 114 of the lever 105 is a threaded nut, which has an interior thread. The further thread section 109 of the axle element 104 has a corresponding outer thread, such that the threaded nut is movable along the outer thread, if the axle element 104 rotates.

The thread element 114 is pivotably attached to the lever section 113, for example by an attachment pin 116. Beside the pivotable arrangement, the thread element 114 is also attached (translationally) shiftable to the lever section 113. Accordingly, the lever section 113 has an elongated hole 115, in which the attachment pin 116 is supported (translationally) shiftable. The formation of the elongated hole 115 is adapted to the swiveling path of the lever 105 and/or of the lever section 113 and the attachment pin 116 upon the rotation of the lever 105 around the deflection point 106.

Thus, the thread element 114 may shift translationally along the further thread section 109 of the axle element 104 (that is, along the rotation axis 117 and/or the shifting direction 201), and the lever 105 may rotate around the deflection point 106, without a mechanical wedging and/or a blocking of the movement mechanics being effected.

In the present embodiment example, the deflection point 106 is formed via a rotation pin 106'. The rotation pin 106' is adjustable relative to the support structure 101, in particular parallel along an axis direction 117 of the axle element 104.

A shifting of the rotation pin 106' and accordingly of the deflection point 106 causes a change of the distance between the lever 105 and the rope drum 102. Upon a change of the distance between the lever 105 and the rope drum 102, and in particular upon a change of the deflection point 106 of the lever 105 relative to the rope drum 102, also the entry (or start) of the blocking position of the lever 105 with respect to a movement of the thread section 108 of the lever 105 along the axle element 104 changes. By a change of the deflection point 106 of the lever 105, also the swiveling path of the blocking section 107 relative to the movement of the thread section 108 of the lever 105 along the axle element 104 changes. The rotation pin 106' forms a rotation axis of the lever 105, wherein the rotation axis is for example not parallel to the rotation axis 117 of the rope drum/axle element and a radial direction of the rotation axis of the rope drum/axle element.

The adjustment of the rotation pin 106' relative to the support structure 101 may also be used to manually release the blocking position of the lever 105, in order to enable an anew reeling of the rope drum 102.

For example, at a first position of the deflection point 106 after a first number of rotations of the rope drum 102, the blocking position of the lever 105 may be reached, while at a second position of the deflection point 106 after another second number of rotations of the rope drum 102, the blocking position of the lever 105 may be reached. Thus, the unreelable rope length of the safety rope 103 can be adjusted by the shifting of the deflection point 106 of the lever 105, because the unreelable rope length is proportional to the number of the rotations of the rope drum 102 up to the reaching of the blocking position.

The rotation pin 106' is coupled to a slider (or pusher) 110 as an actuation means. The slider 110 is configured to adjust the rotation pin 106' relative to the support structure 101.

The slider 110 has a snap section 122 and the support structure 101 has a further snap section 120 (see the embodiment example in FIG. 2B). The snap section 122 and the further snap section 120 are formed such that the rotation pin 106' is adjustable relative to the support structure 101 by actuating the slider and is fixable to the further snap section 120 at a defined position by a catching mechanism of the snap section 122. The slider 110 is configured such that, upon pushing the slider 110, the snap section 122 and the further snap section 120 are decoupled and, upon a simultaneous shifting of the slider 110, an adjustment of the deflection point 106 is effected. The slider 110 has a return force, which is generated for example by means of a spring or by the elastic deformation behaviour thereof (of the slider), such that, by the slider 110, the snap section 122 and the further snap section 120 are coupled again after disabling the pushing movement, and a further shifting of the deflection point 106 is disabled.

Alternatively to the snapping adjustment described above, also and as shown in FIG. 2B, an adjustment screw 202 may be arranged at the support structure, wherein the adjustment screw 202 can be screwed into the actuating means 110 as the slider, and accordingly forms a thread connection with the actuating means 110. Accordingly, the actuating means 110 can be shifted by screwing the adjustment screw 202 as the actuating means 110, and thus, an adjustability of the deflection point 106 can be implemented.

In FIG. 3A to FIG. 3D, a centrifugal force element 302 of the securing device 100 is shown. The centrifugal force element 302 is arranged movably at the rope drum 102. Upon rotation, in particular at (or as from) a predetermined rotation speed, of the rope drum 102, the centrifugal force element 302 is movable radially outwardly (with respect to the rotation axis 117 of the rope drum 102), such that at (or as from) a predetermined rotation speed of the rope drum 102, a form-fit with the support structure 101 can be established. The form-fit of the centrifugal force element 302 with the support structure 101 results in a disabling of the rotation of the rope drum 102, and thus in a stop of the unreeling of the safety rope 103.

Upon a downfall or upon a quick pulling on the ribbon/safety rope 103, the centrifugal force latches of the centrifugal force element 302 are moved out in order to block the rope drum. The blocking by the centrifugal force latches 302 is independent from the adjustment of the actuating means 110.

For this purpose, the support structure 101 has a corresponding interior toothing 304, into which the centrifugal force element 302 engages at a defined rotation speed of the rope drum 102.

The centrifugal force element 302 is arranged pivotably at the rope drum 102, such that at (or as from) a predetermined rotation speed of the rope drum 102, the centrifugal force element 302 swivels radially outwardly and establishes a form-fit with the interior toothing 304 of the support structure 101. The rotation speed of the rope drum 102, as from which the centrifugal force elements 302 swivel outwardly, may be adjusted by corresponding return forces of springs 305, which are arranged between the rope drum 102 and the centrifugal force element 302. Alternatively, the return forces may be adjusted by magnets, which may be arranged correspondingly at the rope drum 102 and at the centrifugal force elements 302.

FIG. 3A to FIG. 3D further show that the rope drum 102 has a toothed ring 303. The toothed ring 303 is attached torque-proofly to the axle element 104 and thus rotates together with the rope drum 102. The toothed ring 303 has an outer toothing, wherein the outer toothing forms the snap notches 301.

Figure 3A:
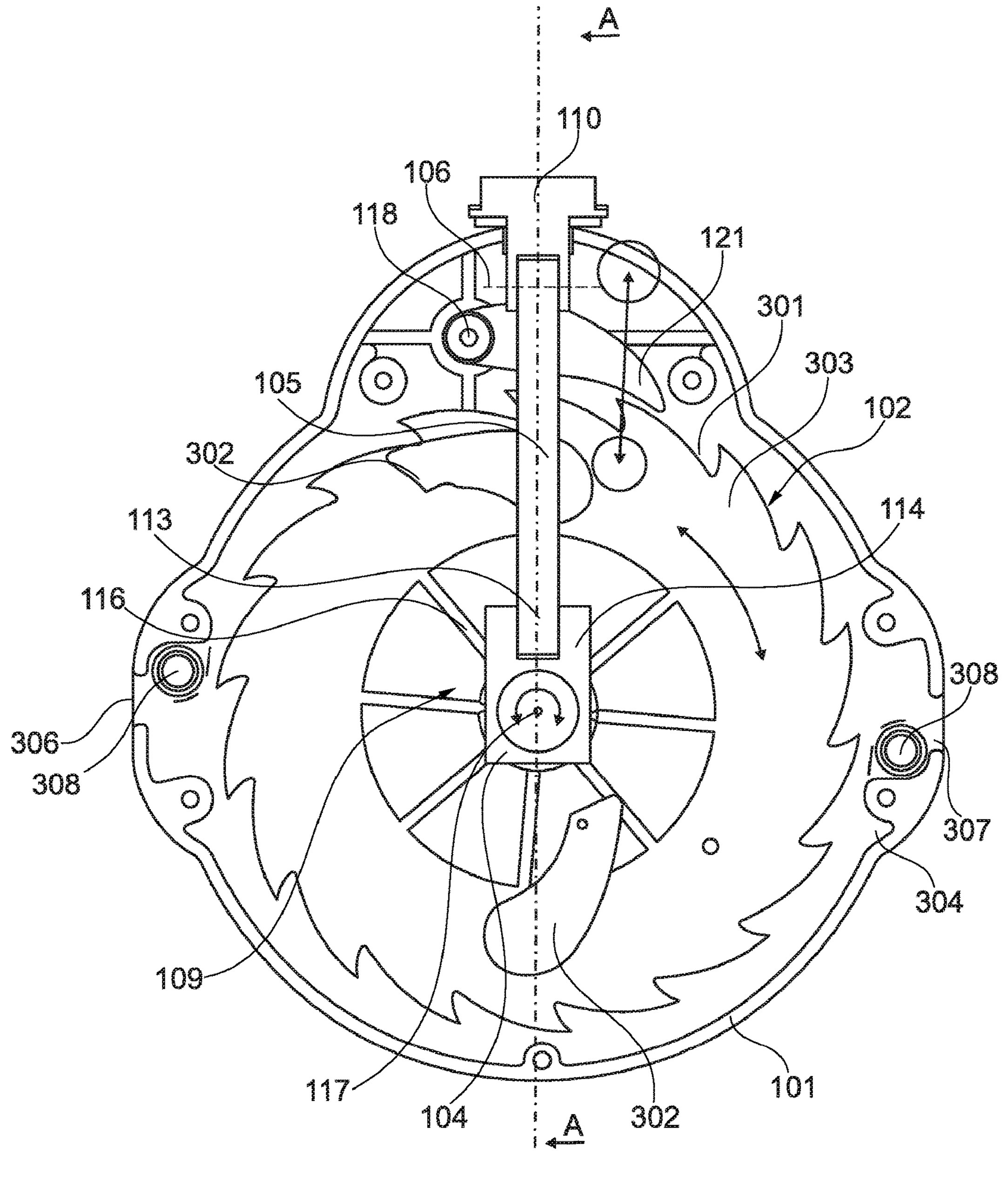
FIG. 3A to FIG. 3D show schematic representations of different embodiments of a toothed ring and a centrifugal force element of the securing devices of FIG. 1 to FIG. 2B.
Figure 3B:
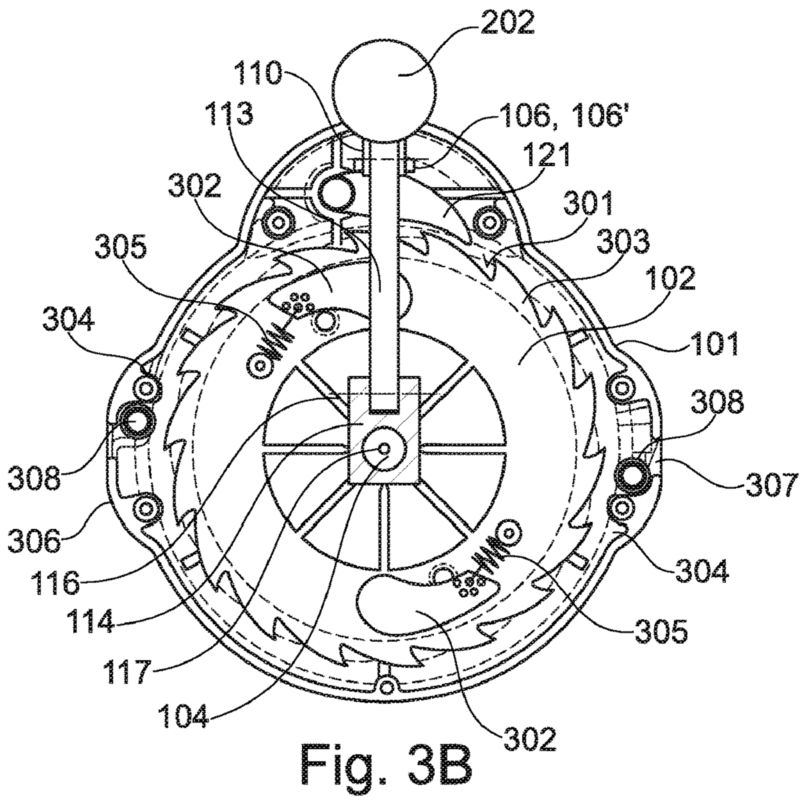
Figure 3C:
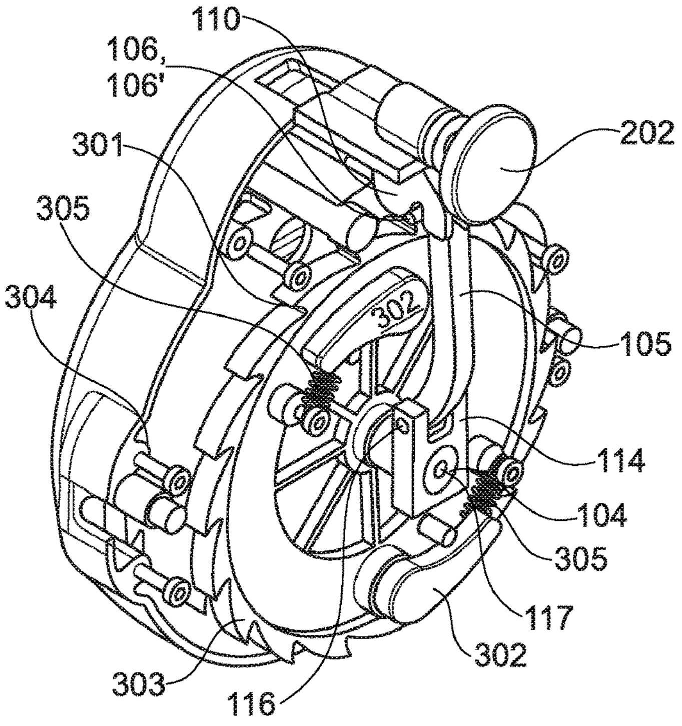
Figure 3D:
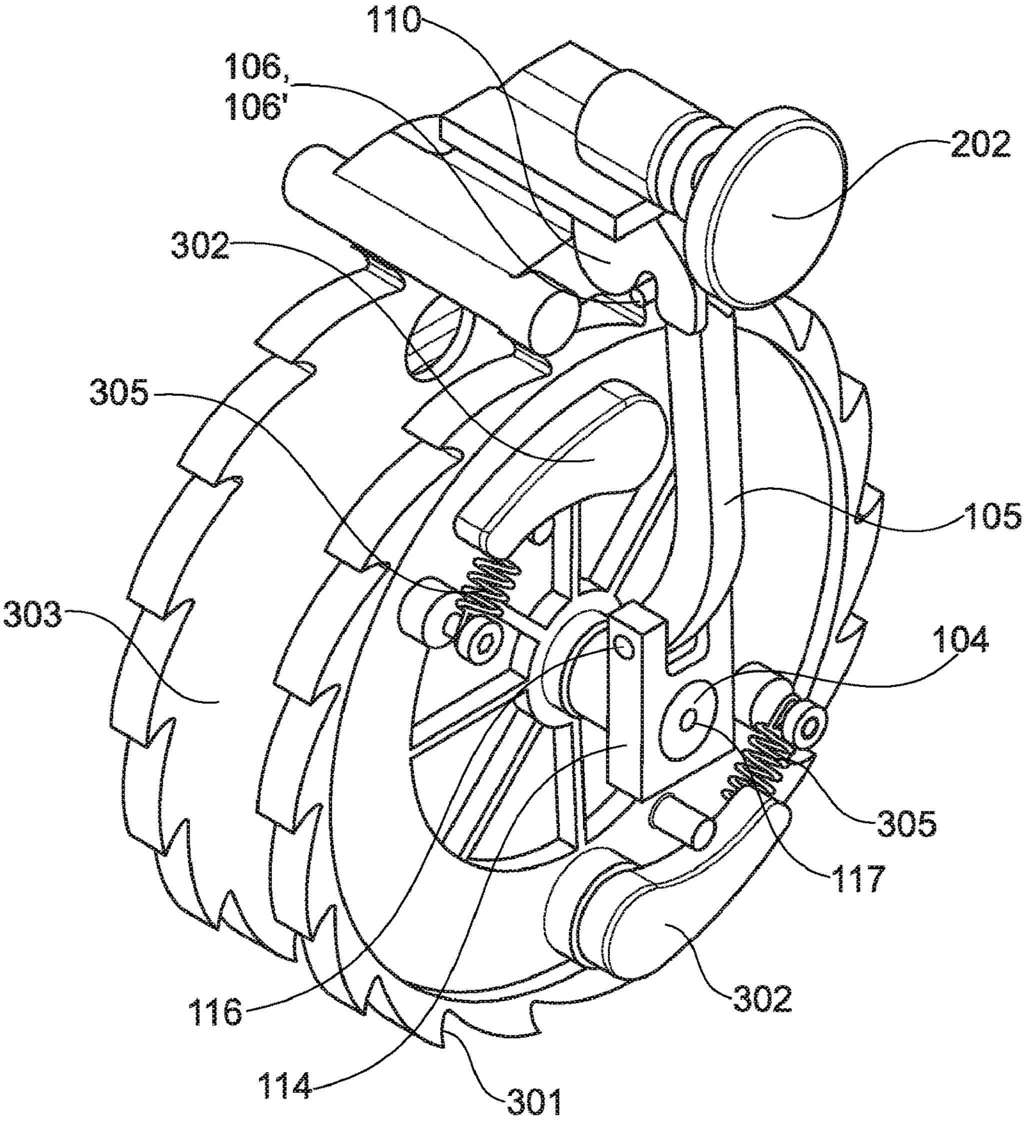

In FIG. 3D, the securing device 100 is represented without the support structure 101. The rope drum 102 may have e.g. two toothed rings 303, 303', which are spaced apart and between which the reeling path 123 runs (or extends).

Figure 6:
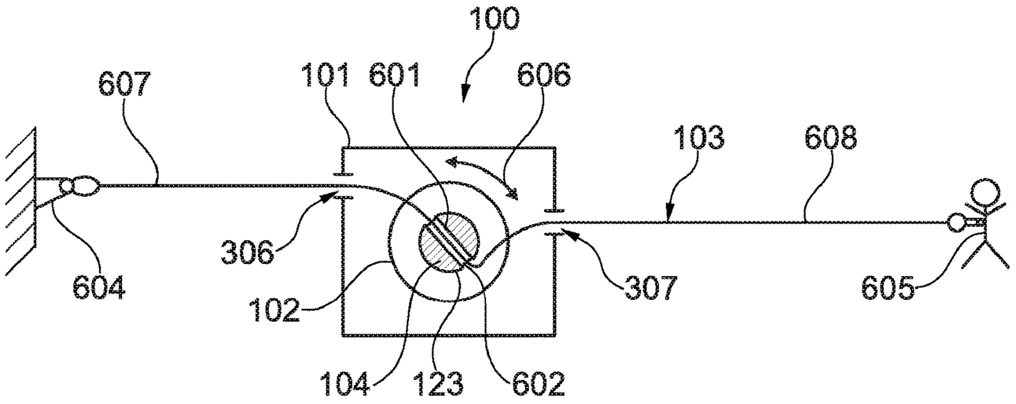
FIG. 6 shows a schematic representation of the securing device, in which the safety rope is guided through the rope drum, according to an exemplary embodiment of the present invention.

The safety rope 103 may be guided through the housing exits 306, 307 of the support structure 101 and through the rope drum 102, as is represented schematically e.g. in FIG. 6. Rollers 308, along which the safety rope 103 may roll along, are arranged around friction points between the safety rope 103 and the housing exits 306, 307.

Figure 4:
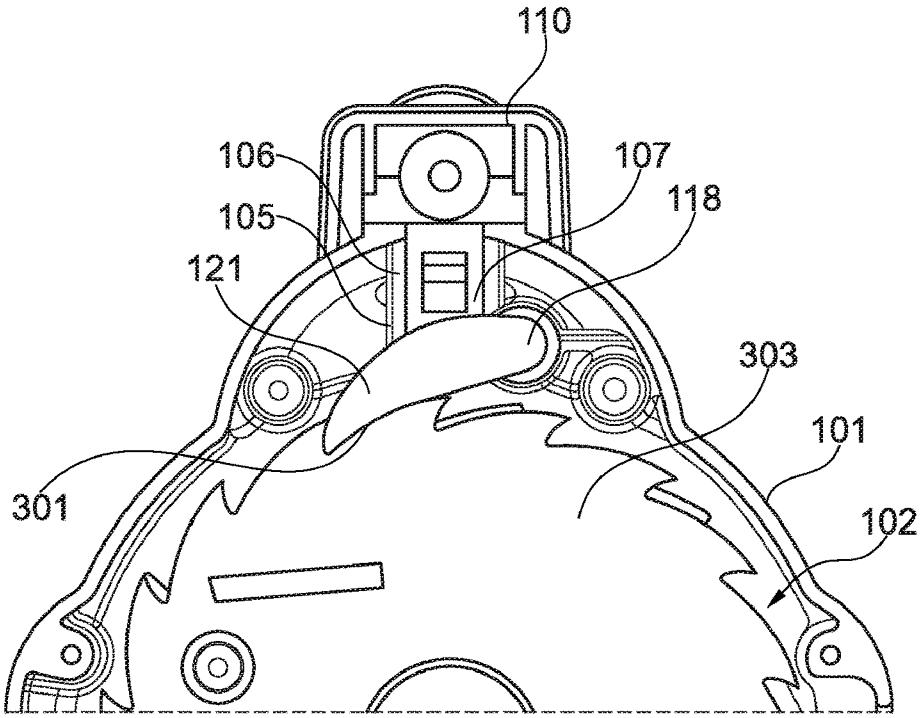
FIG. 4 shows a partial schematic representation of the securing device of FIG. 2B, wherein the snap cam is present in a form-fit engagement with a snap notch, according to an exemplary embodiment of the present invention.

FIG. 4 shows a magnified section of the embodiment of FIG. 3A, wherein the lever 105 is present in the blocking position and thus presses on the snap cam 121. The snap cam 121 in turn engages accordingly in the snap notch 301 of the toothed ring 303, such that a rotation of the rope drum 102 is disabled.

The snap cam 121 and the snap notch 301 are configured such that a wedging occurs in a first rotation direction of the rope drum 102 (in the clockwise direction in FIG. 4) and that a rotation and/or a free-wheeling of the rope drum 102 of the type of a free-wheeling of a clamping body is possible in a second rotation direction, which is opposite to the first rotation direction, of the rope drum 102 (in the counter-clockwise direction in FIG. 4).

Figure 5:
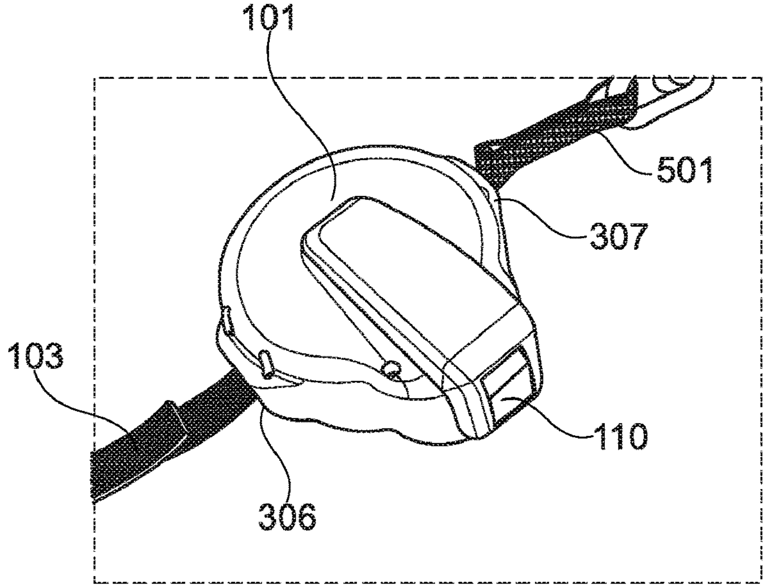
FIG. 5 shows a schematic outside representation of a securing device according to an exemplary embodiment of the present invention.

FIG. 5 shows an exterior representation of the securing device 100 according to the embodiment examples of FIG. 1 to FIG. 4. The support structure 101 is a housing, which houses the essential elements, such as for example the rope drum 102, the axle element 104 and the lever 105. The safety rope 103 is guided through an opening of the support structure 101, for example through the exits 306 and/or 307 of the housing, to the rope drum 102. The safety rope 103 may be guided through the rope drum 102, as is illustrated in FIG. 6. Alternatively, a securing element 501, such as for example a further safety rope, may be attached to the support structure 101. To one side, i.e. either to the safety rope 103 or to the securing element 501, the person to be secured may be attached, and to the other side, i.e. correspondingly to the safety rope 103 or to the securing element 501, the support structure 101 can be attached to a load-bearing structure, such as for example a wall or a support.

Furthermore, the slider 110 is illustrated as an actuating means, which slider extends through the housing as the support structure 101, and which is actuable from the outside in the exterior of the housing. Thus, the unreeling length of the safety rope 103 can be adjusted flexibly.

In FIG. 6, there is described a further embodiment of the rope securing device 100, in which the safety rope 103 is guided through the housing exits 306, 307 of the support structure 101 and through the rope drum 102. The rope drum 102 has a reeling path 123 along a circumferential direction 606 of the rope drum 102, along which reeling path the safety rope 103 is reelable (or can be reeled). The reeling path 123 further has a first opening 601 for rope and a second opening 602 for rope, which is formed along the circumferential direction 606 spaced apart from the first opening 601 for rope. The first opening 601 for rope and the second opening 602 for rope are formed such that the safety rope 103 is guidable through the rope drum 102, and such that upon rotation of the rope drum 102 both opposing rope ends 607, 608 of the safety rope 103 are simultaneously reelable and unreelable (or can be reeled and can be unreeled). The axle element 104 further has a gap or slit, through which the safety rope 103 can be guided between the first opening 601 for rope and the second opening 602 for rope.

As from a predetermined number of rotations of the rope drum 102 and correspondingly as from a defined unreeling length of the first rope end 607 and the second rope end 608, the lever 105 presses on the snap cam 121, according to the embodiment example of FIG. 1 to FIG. 4, which disables a further rotation of the rope drum 102 with respect to the support structure 101, either by a form-fit and/or a friction fit.

Due to the guiding through the rope drum 102 and/or the reeling path 123 thereof, the safety rope 103 is not anchored load-bearingly on the rope drum 102, but extends (or runs) through the latter. Thus, a direct connection exists e.g. between an attachment point 604 and a further attachment point 605, to which e.g. the person to be secured is attached, such that also the flux of force runs directly between the person to be secured and the attachment point 604. Thus, the securing device 100 has more or less only a reeling function and must transmit lower forces.

Supplementarily, it is noted that "having" (or "comprising") does not exclude other elements or steps, and that "a" or "an" does not exclude a plurality. In addition, it is noted that features or steps, which have been described with reference to one of the embodiment examples above, may also be used in combination with other features or steps of other embodiment examples described above. Reference numerals in the claims are not to be construed as limitations.

LIST OF REFERENCE NUMERALS

100 securing device
101 support structure
102 rope drum
103 safety rope
104 axle element
105 lever
106, 106' deflection point, rotation pin
107 blocking section
108 thread section
109 further thread section
110 actuating means
111 first leg
112 second leg
113 lever section
114 thread element
115 elongated hole
116 attachment pin
117 rotation axis of rope drum
118 rotation axis of snap cam
119 shifting direction of deflection point
120 further snap section
121 snap cam
122 snap section
123 reeling path
201 shifting direction of thread elements
301 snap notch
302 centrifugal force element
303 threaded ring
304 interior toothing
305 spring
306 housing exit
307 further housing exit
308 rollers
501 securing element
601 first opening for rope
602 second opening for rope
604 attachment point
605 further attachment point
606 circumferential direction
607 first rope end
608 second rope end

The invention claimed is:

1. A securing device for securing a person, the securing device comprising:

a support structure;

a rope drum, on which a safety rope, to which the person is attachable, is reelable;

an axle element, which is attached in a non-rotational manner to the rope drum and rotatably to the support structure, such that, by the axle element, the rope drum is supported rotatably to the support structure;

a lever attached pivotably to the support structure at a deflection point, wherein the lever has a blocking section, which is configured such that, in a blocking position of the lever, the blocking section is coupled to the rope drum in order to disable a rotation of the rope drum, and such that, in a releasing position of the lever, the blocking section is decoupled from the rope drum and the rope drum is rotatable, wherein the lever has a first thread section, which is spaced apart from the blocking section;

wherein the axle element has a second thread section, wherein the first thread section is coupled to the second thread section, such that, upon rotation of the axle element, due to the rotation of the rope drum, the first thread section is shifted along the axle element, such that, due to the shifting of the first thread section, a rotation of the lever around the deflection point and an adjustment between the blocking position and the releasing position of the lever are effected.

2. The securing device according to claim 1, wherein the lever is formed as an angle lever.

3. The securing device according to claim 2, wherein the lever has a first leg and a second leg, which is bent from the first leg, wherein the blocking section is formed at the first leg and the first thread section is formed at the second leg.

4. The securing device according to claim 1, wherein the lever is configured such that the deflection point is arranged between the first thread section and the blocking section.

5. The securing device according to claim 1,
wherein the first thread section has a lever section and a thread element,
wherein the thread element is attached pivotably to the lever section.

6. The securing device according to claim 5,
wherein the lever section has an elongated hole,
wherein the thread element has an attachment pin, which is supported shiftably in the elongated hole.

7. The securing device according to claim 1,
wherein the blocking section, in the blocking position, forms a friction connection with the rope drum.

8. The securing device according to claim 1,
wherein the rope drum has at least one snap notch,
wherein the lever, in the blocking position, forms a form-fit with the snap notch of the rope drum.

9. The securing device according to claim 8, further having
a snap cam, which is arranged pivotably at the support structure,
wherein, in the blocking position, the blocking section of the lever swivels the snap cam until the snap cam engages in the snap notch for forming the form-fit.

10. The securing device according to claim 8,
wherein the snap notch is configured such that, in the blocking position, the blocking section engages directly in the snap notch for forming the form-fit.

11. The securing device according to claim 1, further comprising
a rotation pin, which secures the lever pivotably to the support structure at the deflection point.

12. The securing device according to claim 11,
wherein the rotation pin is adjustable relative to the support structure along an axis direction of the axle element.

13. The securing device according to claim 12, further having an actuation means, to which the rotation pin is coupled,
wherein the actuation means is configured to adjust the rotation pin relative to the support structure,
wherein the actuation means has a first snap section and the support structure has a second snap section,
wherein the first snap section and the second snap section are configured such that, by actuating the actuation means, the rotation pin is adjustable relative to the support structure and is fixable to the second snap section at a defined position by a catching of the first snap section.

14. The securing device according to claim 1, further having
a centrifugal force element, which is arranged movably at the rope drum;
wherein, upon rotation of the rope drum, the centrifugal force element is movable radially outwardly such that a form-fit with the support structure is producible at a predetermined rotational speed of the rope drum.

15. The securing device according to claim 1, further having
a coil spring,
wherein the coil spring is arranged between the rope drum and the support structure, such that, in the releasing position, the rope drum is rotatable due to a spring force of the coil spring.

16. The securing device according to claim 1,
wherein the rope drum has a reeling path along a circumferential direction of the rope drum, along which reeling path the safety rope is reelable,
wherein the reeling path has a first opening for the rope and a second opening for the rope, which is formed along the circumferential direction spaced apart from the first opening for the rope,
wherein the first opening for the rope and the second opening for the rope are configured such that the rope is guidable through the rope drum and that, upon rotating the rope drum, both opposing rope ends of the rope are reelable and unreelable simultaneously.

17. A method for securing a person by a securing device, the method comprising the following steps:
providing a securing device having:
a rope drum, on which a safety rope, to which the person is attachable, is reelable;
an axle element, which is attached to the rope drum and rotatably to a support structure, such that, by the axle element, the rope drum is supported rotatably to the support structure;
a lever attached pivotably to the support structure at a deflection point, wherein the lever has a blocking section, which is configured such that, in a blocking position of the lever, the blocking section is coupled to the rope drum in order to disable a rotation of the rope drum, and such that, in a releasing position of the lever, the blocking section is decoupled from the rope drum and the rope drum is rotatable,
rotating the rope drum relative to the support structure,
wherein the first thread section of the lever is coupled to the second thread section of the axle element, such that, upon rotation of the axle element, due to the rotation of the rope drum, the first thread section is shifted along the axle element, such that, due to the shifting of the first thread section, a rotation of the lever around the deflection point and an adjustment between the blocking position and the releasing position of the lever are effected.

* * * * *